(12) United States Patent
Dieberger et al.

(10) Patent No.: US 7,458,027 B2
(45) Date of Patent: Nov. 25, 2008

(54) APPARATUS, SYSTEM, AND METHOD FOR DISPLAYING A COMPLEMENTARY HIGH-LEVEL GRAPHICAL REPRESENTATION OF AN ENTERPRISE INFORMATION TECHNOLOGY SYSTEM

(75) Inventors: Andreas Dieberger, Los Gatos, CA (US); Eser Kandogan, Mountain View, CA (US); Cheryl Ann Kieliszewski, San Jose, CA (US); Roberto C. Pineiro, Mayaguez, PR (US); Chung-hao Tan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 320 days.

(21) Appl. No.: 11/277,418

(22) Filed: Mar. 24, 2006

(65) Prior Publication Data

US 2007/0226629 A1    Sep. 27, 2007

(51) Int. Cl.
*G06F 15/00* (2006.01)
*G06F 13/00* (2006.01)

(52) U.S. Cl. ...................... 715/734; 715/854
(58) Field of Classification Search .............. 715/734, 715/853, 854, 673, 764–765, 205
See application file for complete search history.

(56) References Cited

U.S. PATENT DOCUMENTS

| | | | |
|---|---|---|---|
| 5,909,217 A | 6/1999 | Bereiter | 345/357 |
| 6,040,834 A | 3/2000 | Jain et al. | 345/356 |
| 6,144,962 A * | 11/2000 | Weinberg et al. | 707/10 |
| 6,628,304 B2 * | 9/2003 | Mitchell et al. | 715/734 |
| 2002/0112237 A1 | 8/2002 | Kelts | 725/39 |
| 2002/0113816 A1 | 8/2002 | Mitchell et al. | 345/734 |

OTHER PUBLICATIONS

"Advanced Network Mapping", http://www.castlerock.com/products/snmpc/network_map.htm retrieved on Nov. 10, 2005.

* cited by examiner

*Primary Examiner*—Cao Nguyen
(74) *Attorney, Agent, or Firm*—Kunzler & McKenzie

(57) ABSTRACT

An apparatus, system, and method are disclosed for displaying a complementary, high-level graphical representation of an enterprise information technology system. A primary visualization module displays a primary visualization that is a schematic representation of one or more elements of a selected portion of an enterprise information technology system. A minimap module displays a minimap that is an abstracted, high-level schematic representation of the enterprise information technology system. A navigation module demarks a primary visualization representation within the minimap that corresponds to the primary visualization. In one embodiment, the navigation module modifies the primary visualization representation and the corresponding primary visualization in response to a user input directed to the demarked primary visualization representation within the minimap.

18 Claims, 9 Drawing Sheets

APPARATUS, SYSTEM, AND METHOD FOR DISPLAYING A COMPLEMENTARY HIGH-LEVEL GRAPHICAL REPRESENTATION OF AN ENTERPRISE INFORMATION TECHNOLOGY SYSTEM

BACKGROUND OF THE INVENTION

1. Field of the Invention

This invention relates to complementary graphical representations and more particularly relates to a complementary high-level graphical representation of an enterprise information technology system.

2. Description of the Related Art

Information technology systems are becoming increasingly important to all aspects of organizations. As a result, the size and complexity of many information technology systems are growing rapidly. For example, an enterprise information technology system may include data centers at a plurality of sites, with a plurality of high-bandwidth communications channels between each data center. In addition, each data center may include a plurality of devices, herein referred to as elements, including mainframe computers, servers, data storage libraries, data storage devices, routers, switches, terminals, workstations, printers, and the like.

A graphical visualization of an information technology system may be employed to aid an administrator in navigating the complexity of the enterprise information technology system. For example, the graphical visualization may depict elements and groups of aggregated elements with varying levels of detail. The administrator may use the depicted elements to locate, query, and manage the elements of the system. For example, the administrator may use the graphical visualization to locate a storage device, query the storage device for performance data, and direct the storage to go offline after migrating data to other storage devices.

Unfortunately, the administrator may lose the global context of the entire information technology system while using the graphical visualization to focus on a subset of elements within the enterprise information technology system. For example, the administrator may be unable to easily determine the relationship of the storage device to a mainframe computer while viewing a detail of the storage subsystem that comprises the storage device.

From the foregoing discussion, it should be apparent that a need exists for an apparatus, system, and method that display a complementary, high-level graphical representation of an information technology system. Beneficially, such an apparatus, system, and method would provide context for navigations of detailed views of the information technology system.

SUMMARY OF THE INVENTION

The present invention has been developed in response to the present state of the art, and in particular, in response to the problems and needs in the art that have not yet been fully solved by currently available graphical visualization systems. Accordingly, the present invention has been developed to provide an apparatus, system, and method for displaying a complimentary, high-level graphical representation that overcome many or all of the above-discussed shortcomings in the art.

The apparatus to display a complimentary, high-level graphical representation is provided with a plurality of modules configured to functionally execute the steps of displaying a primary visualization, displaying a minimap, and demarking a primary visualization representation within the minimap. These modules in the described embodiments include a primary visualization module, a minimap module, and a navigation module.

The primary visualization module displays a primary visualization. The primary visualization is a schematic representation of one or more elements of a selected portion of an enterprise information technology system. The enterprise information technology system comprises a plurality of elements such as servers, mainframe computers, storage subsystems, and the like. The primary visualization may be displayed in a graphical user interface window, herein referred to as a window.

The minimap module displays a minimap. The minimap is an abstracted, high-level schematic representation of the enterprise information technology system. In one embodiment, the minimap is configured as a window within a primary visualization window. The minimap may display each element of the enterprise information technology system. Alternatively, the minimap may display a plurality of aggregated elements wherein each element of the enterprise information technology system is aggregated within a displayed aggregated element.

The navigation module demarks a primary visualization representation within the minimap. The primary visualization representation corresponds to the primary visualization, demarking the elements, including aggregated elements, of the enterprise information technology system that are displayed by the primary visualization. The apparatus provides a complementary, high-level graphical representation of the enterprise information technology system that supports user navigation of the primary visualization.

A system of the present invention is also presented to display a complimentary, high-level graphical representation. The system may be embodied in an enterprise information technology system. In particular, the system, in one embodiment, includes a workstation that communicates with the enterprise information technology system.

The enterprise information technology system may include but is not limited to one or more servers, one or more mainframe computers, one or more clients, one or more routers, one or more bridges, and one or more storage subsystems comprising a plurality of storage devices. In one embodiment, the workstation is used to manage the enterprise information technology system.

The workstation executes one or more software processes that embody a primary visualization module, a minimap module, and a navigation module. In addition, the software processes may embody a status module and a search indicator module.

The primary visualization module displays a primary visualization that is a schematic representation of one or more elements of a selected portion of the enterprise information technology system. The minimap module displays a minimap that is an abstracted, high-level schematic representation of the enterprise information technology system. The navigation module demarks a primary visualization representation within the minimap. In addition, the navigation module may modify the primary visualization representation and the corresponding primary visualization in response to a user input directed to the demarked primary visualization representation within the minimap.

The status module indicates a status of each element represented within the minimap. The status module may employ text, a status bar, a color, a pattern, or the like to indicate the status. The search indicator module indicates the relative location of a specified element on the minimap. In one embodiment, the selected element is identified by a search.

The system displays a high-level graphical representation of the enterprise information technology system that complements the primary visualization, providing a user with context information for the enterprise information technology system.

A method of the present invention is also presented for displaying a complimentary, high-level graphical representation. The method in the disclosed embodiments substantially includes the steps to carry out the functions presented above with respect to the operation of the described apparatus and system. In one embodiment, the method includes displaying a primary visualization, displaying a minimap, and demarking a primary visualization representation within the minimap.

A primary visualization module displays a primary visualization that is a schematic representation of one or more elements of a selected portion of an enterprise information technology system. A minimap module displays a minimap that is an abstracted, high-level schematic representation of the enterprise information technology system. A navigation module demarks a primary visualization representation within the minimap. In one embodiment, the navigation module modifies the primary visualization representation and the corresponding primary visualization in response to a user input directed to the demarked primary visualization representation within the minimap. The method provides a high-level graphic representation that provides context and supports navigation for a primary visualization of the enterprise information technology system.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention displays a complimentary, high-level graphical representation of an enterprise information technology system that provides context for a primary visualization of the enterprise information technology system. In addition, the embodiment of the present invention supports navigating the primary visualization within the context of the enterprise information technology system. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
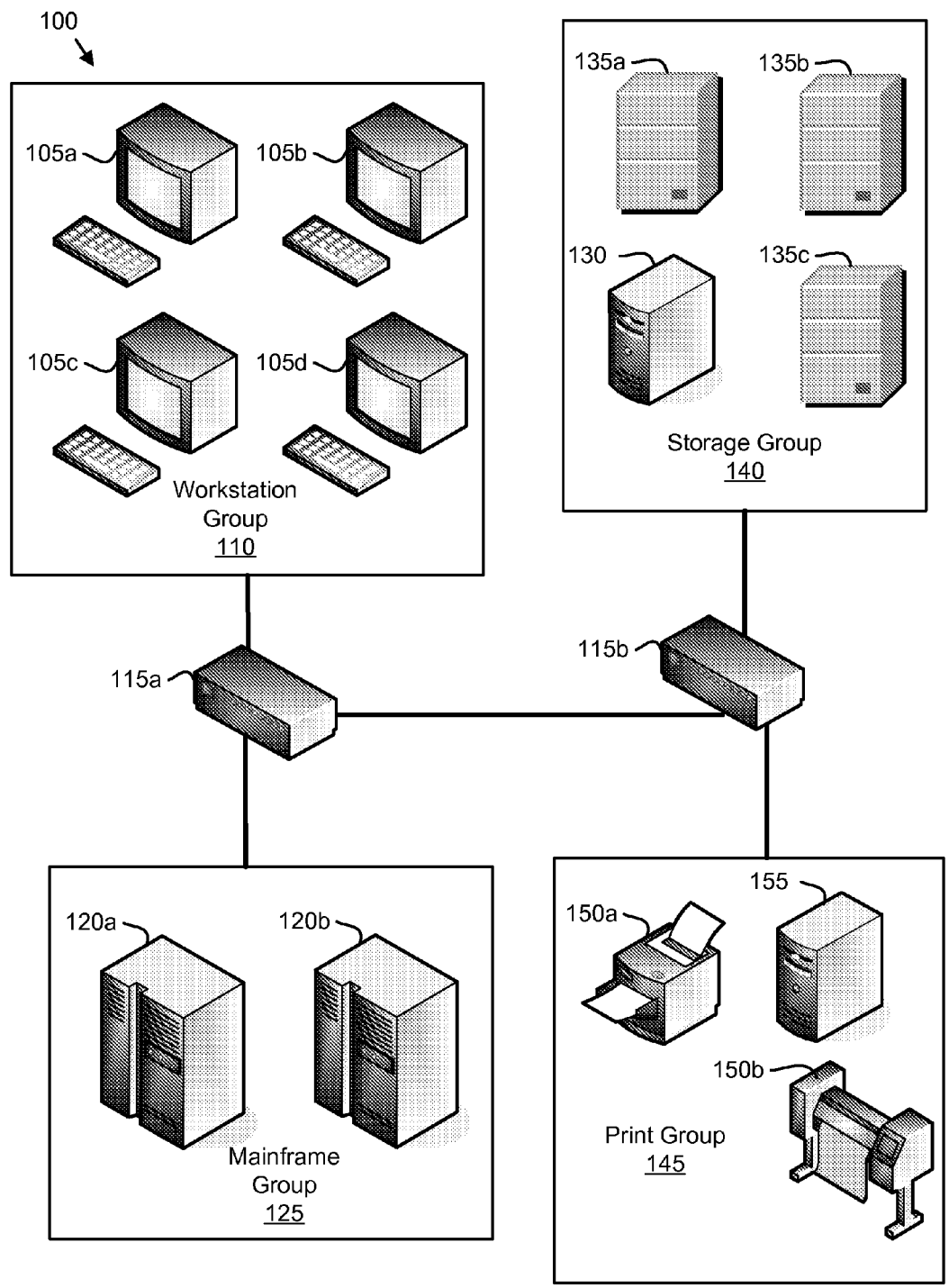
FIG. 1 is a schematic block diagram illustrating one embodiment of an information technology system in accordance with the present invention.

FIG. 1 is a schematic block diagram illustrating one embodiment of an information technology system 100 in accordance with the present invention. The system 100 includes one or more workstations 105, one or more mainframes 120, one or more storage systems 135, a storage server 130, one or more printers 150, a print server 155, and one or more bridges 115. Although for simplicity the system 100 is depicted with four workstations 105, two mainframes 120, three storage systems 135, one storage server 130, two printers 150, one print server 155, and two bridges 115, any number of workstations 105, mainframes 120, storage systems 135, storage servers 130, printers 150, print servers 155, and bridges 115 may be employed.

The workstations 105, mainframes 120, storage systems 135, storage server 130, printers 150, print server 155, and bridges 115 may be referred to collectively as elements. In addition to the elements depicted, the system 100 may include servers, hubs, and the like that are omitted for simplicity. The elements of the system 100 are in communication through a plurality of connections as is well known to those skilled in the art. The connections may be Ethernet networks, token ring networks, fiber optic networks, dedicated data buses, or the like. Although the elements of the system 100 are depicted as interconnected in a particular configuration, the elements may be interconnected in any configuration.

The workstations 105 may be terminals, computers, laptop computers, personal digital assistants, or the like. A user may employ a workstation 105 for data processing tasks. In one embodiment, the workstations 105 are organized in a workstation group 110. The workstation group 110 may be displayed as an aggregation of elements as will be described hereafter.

The mainframes 120 may perform data processing tasks such as maintaining a database, processing transactions, or the like. For example, a first mainframe 120a may execute a transaction database software application for a user of a first workstation 105a. The mainframes 120 are depicted organized as a mainframe group 125 that may be displayed as an aggregation of mainframe elements as will be described hereafter.

The storage systems 135 may be hard disk drives, data storage libraries, optical storage devices, micromechanical devices, or the like. In one embodiment, each storage system 135 includes one or more storage controllers and one or more storage devices. The storage systems 135 may store data for the workstations 105 and the mainframes 120. The workstations 105 and mainframes 120 may communicate with the storage systems 135 through the storage server 130. The storage systems 135 and storage server 130 are depicted organized as a storage group 140 that may be displayed as an aggregation of elements as will described hereafter.

The printers 150 may print documents for the workstations 105 and the mainframes 120. The workstations 105 and mainframes 120 may submit print jobs to the print server 155 for printing on the printers 150. The printers 150 and print server 155 are depicted organized as a print group 145 that may be displayed as an aggregation of print elements as will be described hereafter.

Figure 2:
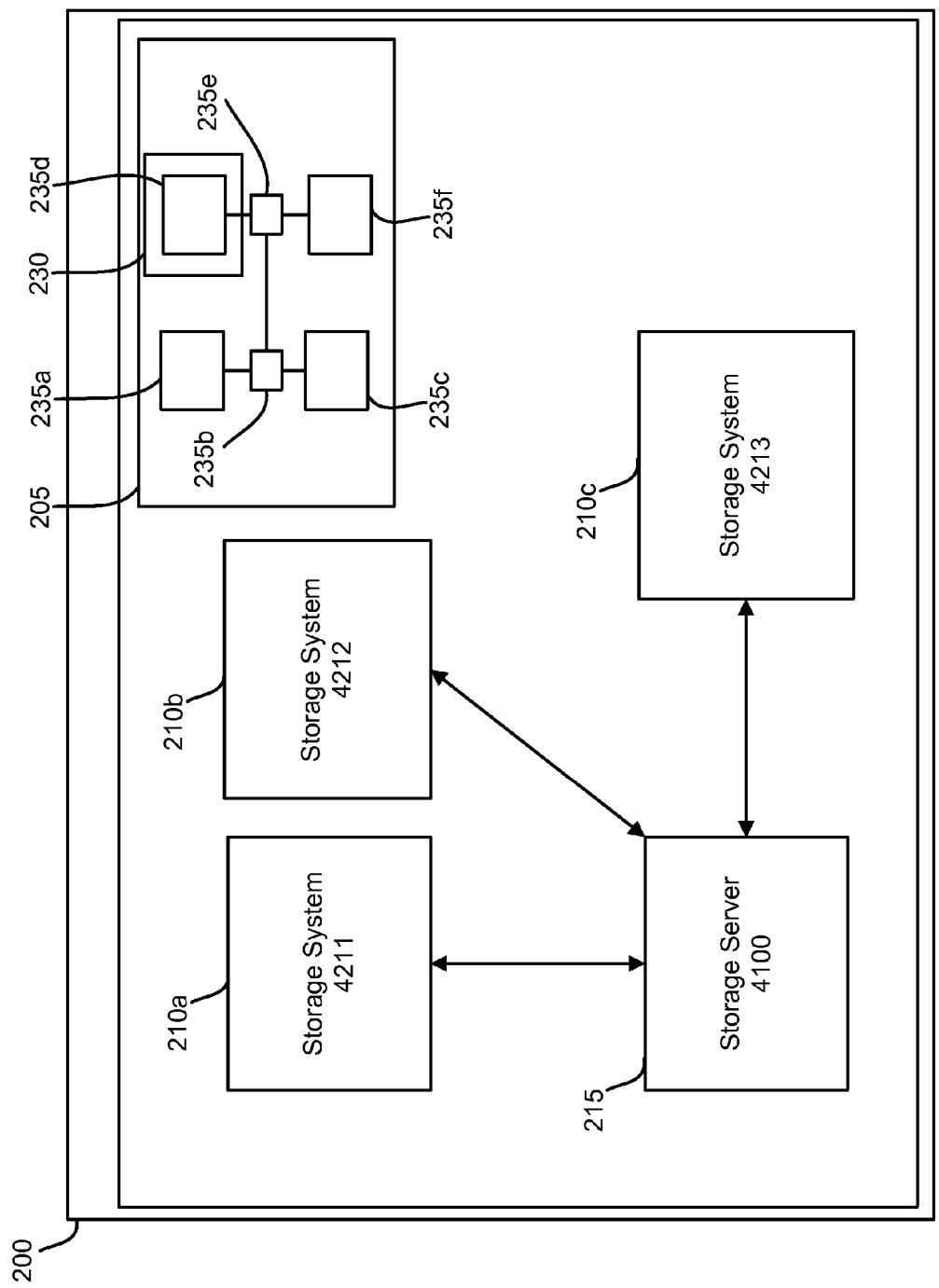
FIG. 2 is a schematic block diagram illustrating one embodiment of a primary visualization window of the present invention.

FIG. 2 is a schematic block diagram illustrating one embodiment of a primary visualization window 200 of the present invention. The primary visualization window 200 may be a graphical user interface window. As depicted, the window 200 is a prophetic example of one embodiment of the present invention. The window 200 may be displayed by a workstation 105 such as a workstation 105 of FIG. 1. The description of the window 200 refers to elements of FIG. 1, like numbers referring to like elements.

The primary visualization window 200 displays the storage systems 135 and storage server 130 of the storage group 140 as a primary visualization. A first storage system 135a is displayed as a first storage system schematic box 210a, a second storage system 135b is displayed as a second storage system schematic box 210b, a third storage system 135c is displayed as a third storage system schematic box 210c, and the storage server 130 is displayed as a storage server schematic box 215.

Each schematic box 210, 215 is identified by a text identifier such as "Storage System" and/or "Storage Server." In addition, each schematic box 210, 215 includes an identifier such as "4100" and "4211". A user may employ the primary visualization of the primary visualization window 200 to determine the status of the storage systems 135 and storage server 130 by interacting with the storage system schematic boxes 210 and the server schematic box 215.

In one embodiment, an automated reporting system reports status details through the primary visualization. In a prophetic example, the automated reporting system may report the status details for each element displayed by the primary visualization. The status details may be displayed using text, a status bar, a color, a shading, a boundary, a flashing, and a pattern.

In a prophetic example, the user may select the first storage system schematic box 210a and receive status details of the first storage system 135a. In one embodiment, the user selects a schematic box 210, 215 by positioning a cursor over the schematic box 210, 215 with a pointing device such as a mouse, a track ball, or the like and depressing a key such as a keyboard key and/or a mouse key. Alternatively, the user may select the schematic box 210, 215 by indicating the schematic box 210, 215 on a touch screen. In a certain embodiment, the user may select the schematic box 210, 215 using one or more keystrokes such as with a plurality of TAB keystrokes and/or by entering an identifier.

In an alternate embodiment, the user may receive status information for a schematic box 210, 215 in response to a cursor hover, wherein the user positions a cursor near the schematic box 210,215. In a prophetic example, the user may position a cursor near the second storage system schematic box 210b to receive status information on write latencies for the second storage system 135b.

In one embodiment, the user selects a schematic box 210, 215 to manage the device represented by the schematic box 210, 215. In a prophetic example, the user may select the third storage system schematic box 210c to display a menu of management options as is well known to those skilled in the art. The user may further select a management option such as an option to migrate data from the third storage system 135c and to take the third storage system 135c offline for maintenance.

The primary visualization window 200 further includes a minimap 205. In the depicted embodiment, the minimap 205 is displayed as a window within the primary visualization window 200. Alternatively, the minimap 205 may be displayed in an independent window. In a certain embodiment, the primary visualization window 200 and the minimap 205 are each independently displayed and positioned on a display.

The minimap 205 includes a plurality of aggregated elements 235. In one embodiment, the aggregated elements 235 comprise functionally similar elements. In the depicted prophetic example, a first aggregated element 235a represents the workstation group 110. A second aggregated element 235b represents a first bridge 115a. A third aggregated group 235c represents the mainframe group 125. A fourth aggregated group 235d represents the storage group 140. In the prophetic example, the storage group 140 is displayed in detail in the primary visualization window 200 as discussed above. A fifth aggregated group 235e represents a second bridge 115b. A sixth aggregated group 235f represents the print group 145. Each aggregated group 235 may aggregate one or more elements to form a broad, high-level graphical representation of the enterprise information technology system 100.

In the depicted embodiment, a demarcation box 230 demarks the fourth aggregated group 235d representing the storage group 140 as the primary visualization of the primary visualization window 200. Alternatively, fourth aggregated group 235d may be demarked as the primary visualization by highlighting the fourth aggregated group 235d, by shading the group 235d, and by similar demarcation means. Demarking the fourth aggregated group 235d provides the user a global context for the primary visualization. The user can see the relation of the demarked fourth aggregated group 235d to the system 100, including the connection of the storage group 140 represented by the fourth aggregated group 235d to the system 100 through the second bridge 115b that is represented by the fifth aggregated group 235e.

Figure 3:
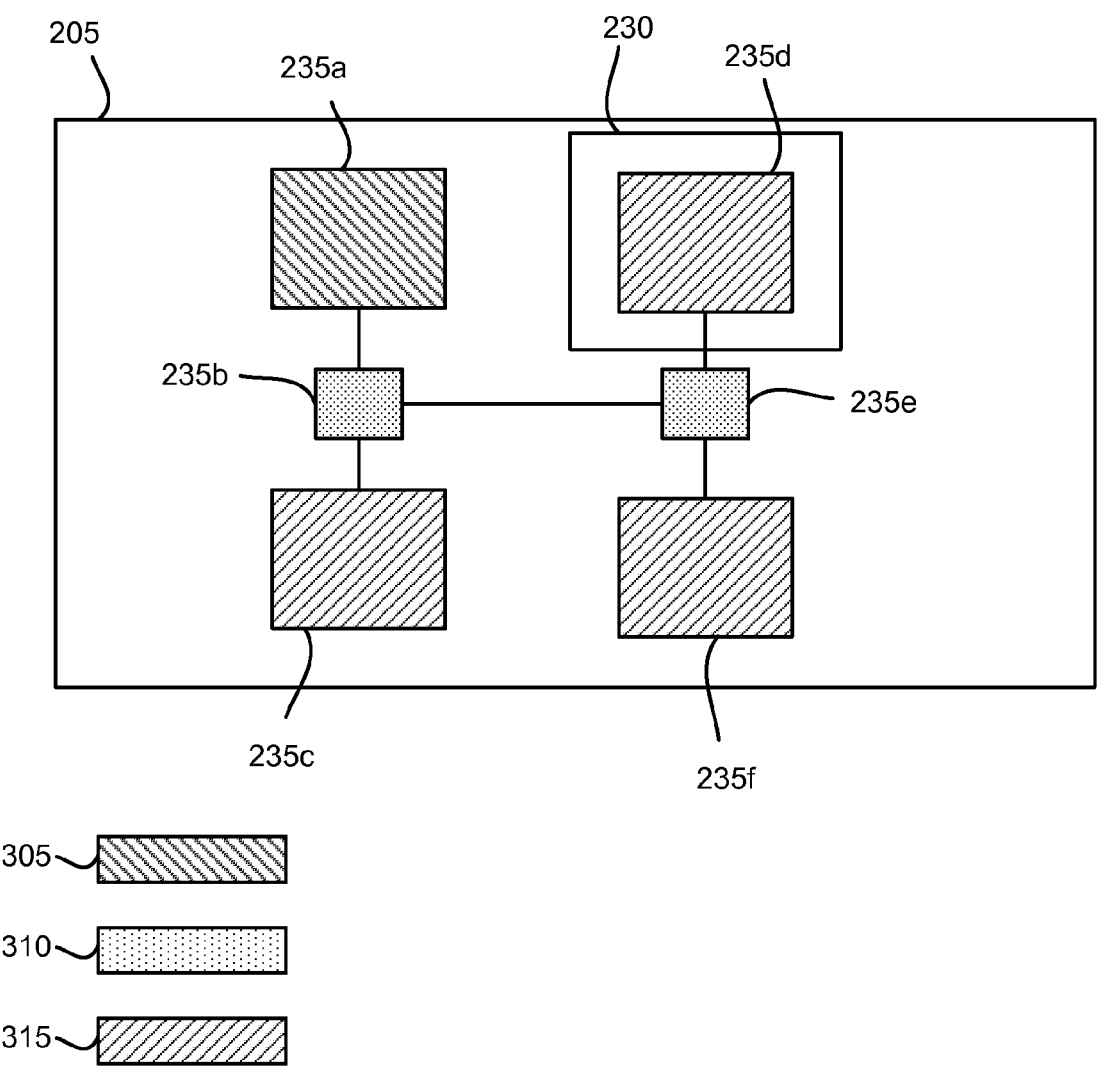
FIG. 3 is a schematic block diagram illustrating one embodiment of a minimap of the present invention.

FIG. 3 is a schematic block diagram illustrating one embodiment of a minimap 205 of the present invention. The minimap 205 depicts a prophetic example of status indication using the minimap of FIG. 2. A plurality of indicators 305, 310, 315 are shown imposed on the aggregated elements 235 to indicate the status of the aggregated elements 235 and/or the status of elements embodied by the aggregated elements 235. The description of the minimap 205 refers to elements of FIGS. 1-2, like numbers referring to like elements.

In the prophetic example, the first aggregated group 235a is demarked with a first indicator 305 to indicate the status the workstation group 1 10 represented by the first aggregated group 235a. The first indicator 305 may indicate that the workstation group 110 is violating operational parameters and/or is in need of maintenance. Although a pattern is used in the depicted primary visualization window 205 to indicate status, text, a status bar, a color, a shading, a boundary, and a flashing of the graphical symbols comprising the aggregated group 235a, referred to herein as flashing, may also be employed.

In the prophetic example, the second and fifth aggregated elements 235b, 235e representing the first and second bridges 115a, 115b are demarked with a second indicator 310. In one embodiment, the second indicator 310 may indicate a status of the bridges 115 such capacity utilization, an error rate, or the like. In an alternate embodiment, the second indicator 310 may indicate a functional type. For example, the second indicator 310 may indicate that the bridges 115 represented by the second and fifth aggregated elements 235b, 235e have a communications functional type.

In the prophetic example, the third, fourth, and sixth aggregated elements 235c, 235d, 235f are demarked with a third indicator 315. In one embodiment, the third indicator 315 may indicate a status such as a normal health. Alternatively, the third indicator 315 may indicate a functional type such as devices that support workstations 105. In a certain embodiment, the third indicator 315 may indicate time remaining until a scheduled maintenance procedure.

Figure 4:
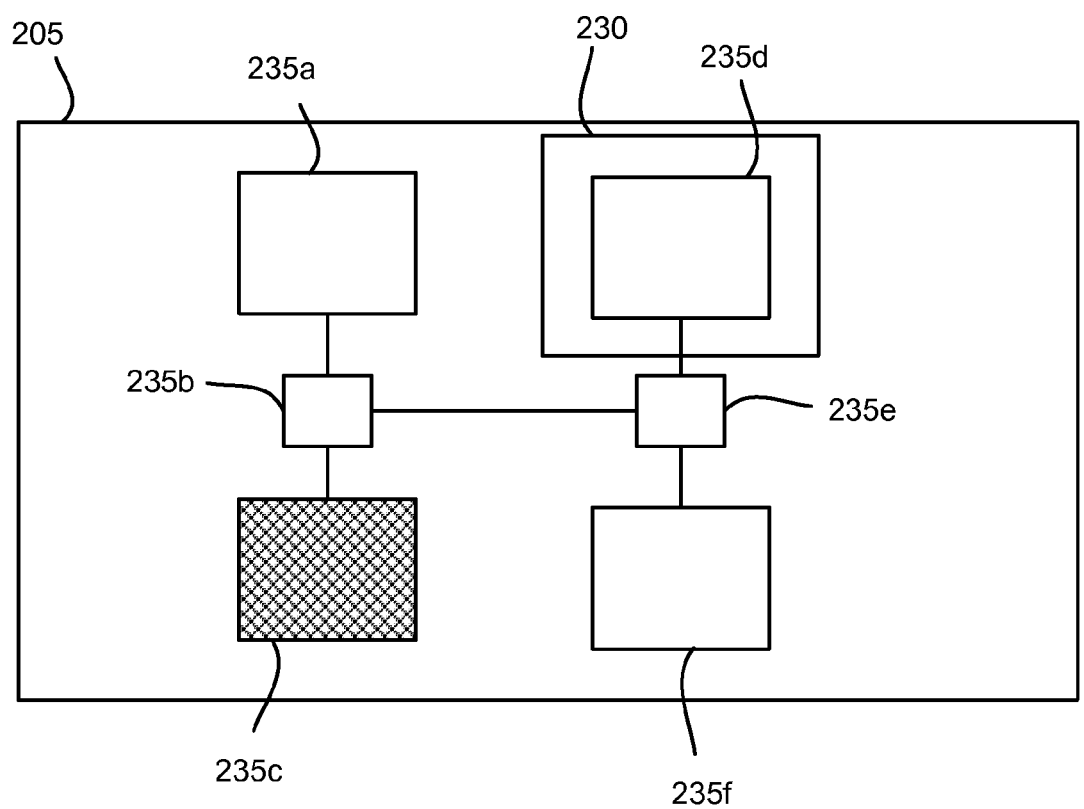
FIG. 4 is a schematic block diagram illustrating one alternate embodiment of a minimap of the present invention.

FIG. 4 is a schematic block diagram illustrating one alternate embodiment of a minimap 205 of the present invention. The minimap 205 depicts a prophetic example of location indication using the minimap of FIG. 2. The description of the minimap 205 refers to elements of FIGS. 1-3, like numbers referring to like elements.

The third aggregated element 235c is indicated with a pattern. Alternatively, the third aggregated element 235c may be indicated by text, a status bar, a color, a shading, a boundary, and a flashing. The third aggregated element 235c may be indicated to show the location of a specified element within the third aggregated element 235c. Alternatively, the third aggregated element 235c to indicate that the third aggregated element 235c is the specified element. The specified element may be specified in response to a search. For example, the user may specify a device identifier and the minimap 205 may indicate the location of the device with the specified device identifier.

Alternatively, the specified element may be specified in response to an error code, a maintenance request, or the like. For example, a first mainframe 120a of the mainframe group 125 may request service and the minimap 205 may indicate the location of the first mainframe 120a within the third aggregated group 235c representing the mainframe group 125.

Figure 5:
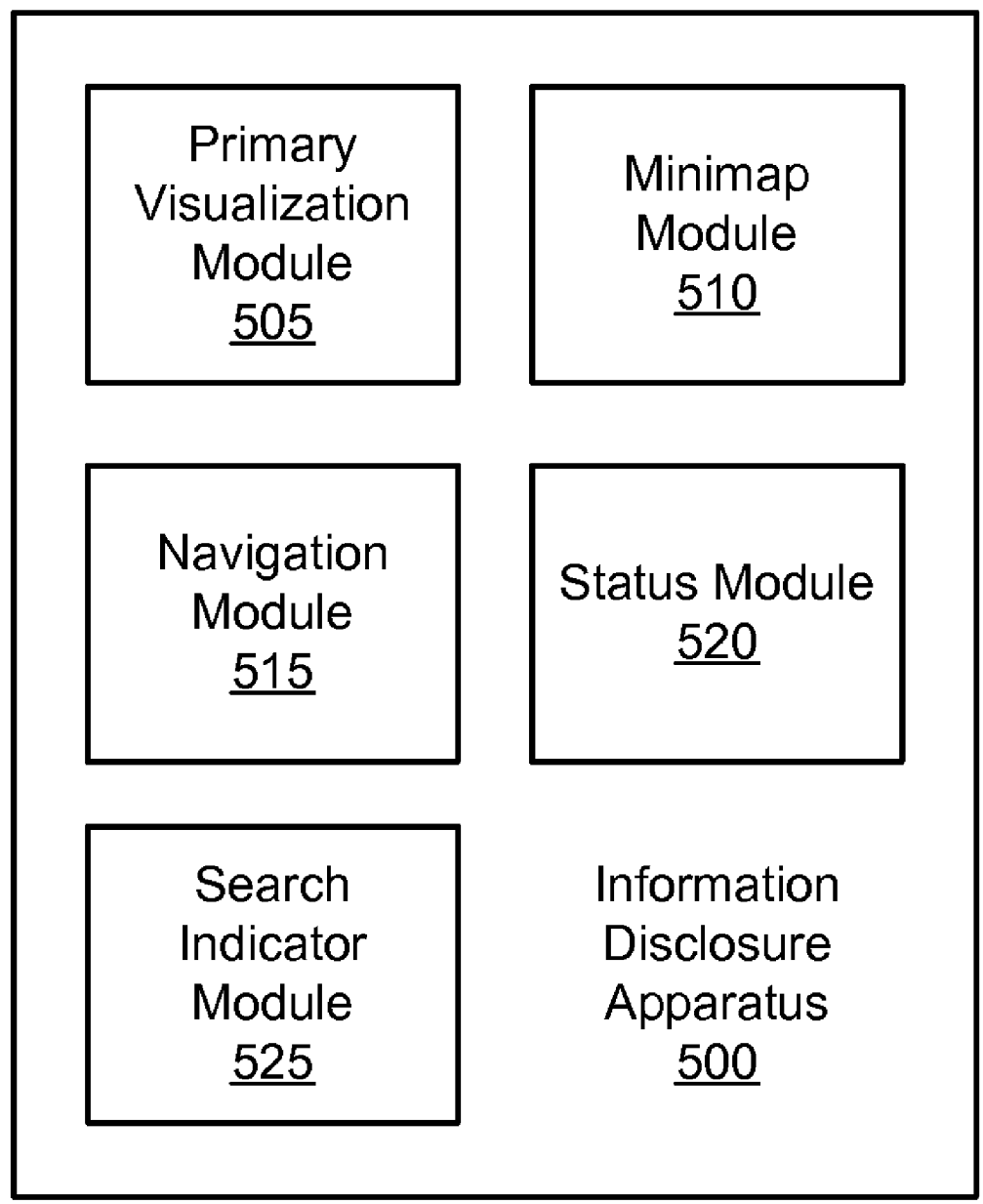
FIG. 5 is a schematic block diagram illustrating one embodiment of an information disclosure apparatus of the present invention.

FIG. 5 is a schematic block diagram illustrating one embodiment of an information disclosure apparatus 500 of the present invention. The apparatus 500 may be embodied in a workstation 105. In addition, the description of the apparatus 500 refers to elements of FIGS. 1-4, like numbers referring to like elements. The apparatus 500 includes a primary visualization module 505, minimap module 510, navigation module 515, status module 520, and search indicator module 525.

The primary visualization module 505 displays a primary visualization. The primary visualization is a schematic representation of one or more elements of a selected portion of an enterprise information technology system such as the system 100 of FIG. 1. In one embodiment, the primary visualization is embodied in the primary visualization window 200 of FIG. 2.

The minimap module 510 displays a minimap 205. As illustrated in FIGS. 2-4, the minimap 205 is an abstracted, high-level schematic representation of the enterprise information technology system 100. As depicted in FIG. 2, the minimap 205 may be displayed as a window within the primary visualization window 200. The minimap 205 may display a plurality of aggregated elements 235 wherein each element of the enterprise information technology system 100 is aggregated within a displayed aggregated element 235. Alternatively, the minimap 205 may display each element of the enterprise information technology system 100.

The navigation module 515 demarks a primary visualization representation within the minimap 205. In a prophetic example, the navigation module 515 may demark the primary visualization representation with the demarcation box 230 of FIGS. 2-4. The primary visualization representation corresponds to the primary visualization of the primary visualization window 200, demarking the elements, including aggregated elements 235, of the enterprise information technology system 100 that are displayed by the primary visualization window 200.

The status module 520 indicates a status of each element including each aggregated element 235 represented by the minimap 205. The status module 520 may employ text, a status bar, a color, a shading, a boundary, a flashing, a pattern, and the like to indicate the status.

The search indicator module 525 indicates the relative location of a specified element on the minimap 205 such as within an aggregated group 235. In one embodiment, the selected element is identified by a search. The apparatus 500 provides a complementary, high-level graphical representation of the enterprise information technology system 100 that provides context for and supports user navigation of the primary visualization.

Figure 6:
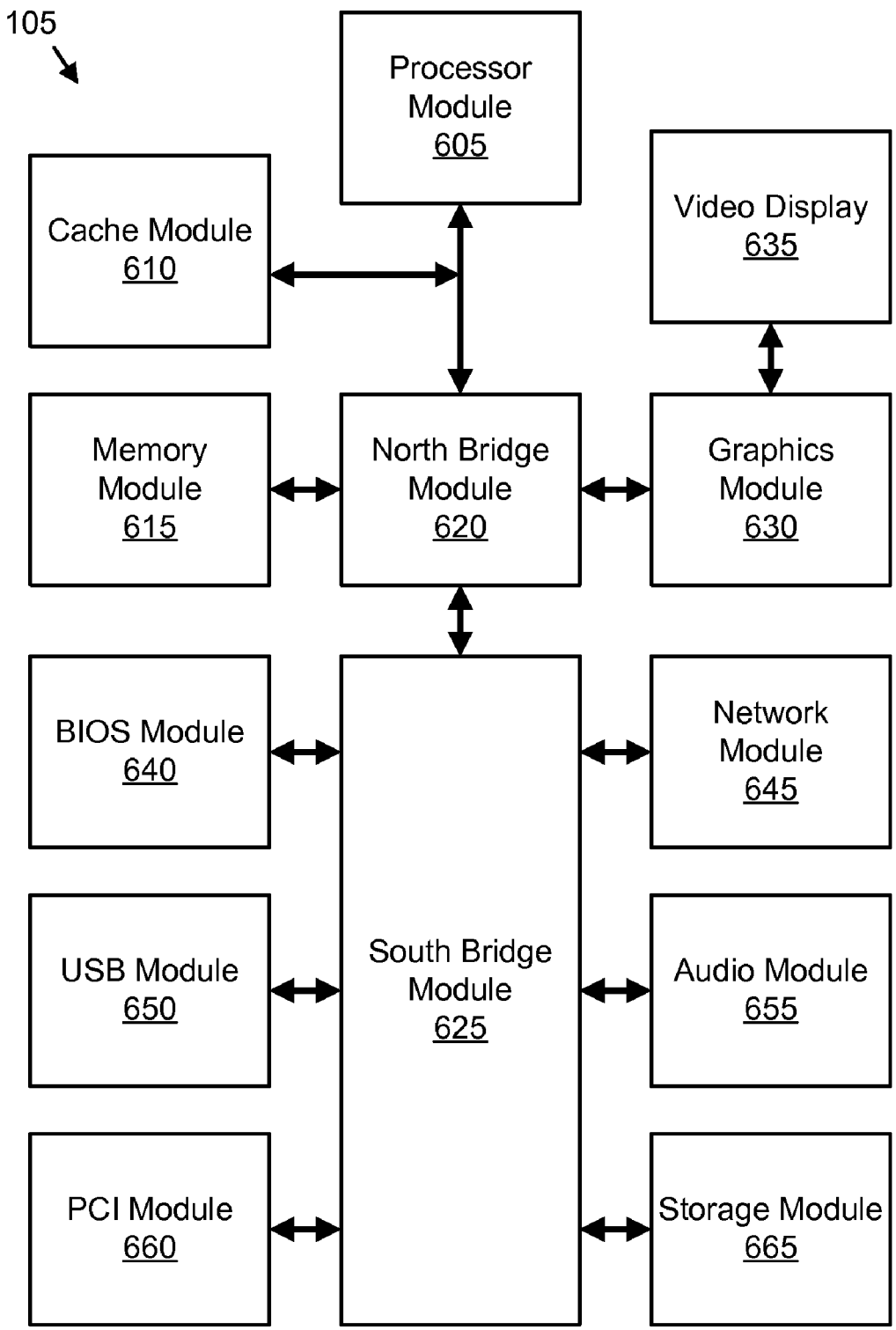
FIG. 6 is a schematic block diagram illustrating one alternate embodiment of a workstation of the present invention.

FIG. 6 is a schematic block diagram illustrating one alternate embodiment of a workstation 105 of the present invention. The workstation 105 includes a processor module 605, a cache module 610, a memory module 615, a north bridge module 620, a south bridge module 625, a graphics module 630, a display module 635, a basic input/output system ("BIOS") module 340, a network module 645, a universal serial bus ("USB") module 650, an audio module 655, a peripheral component interconnect ("PCI") module 660, and a storage module 665. The description of the workstation 105 refers to elements of FIGS. 1-5, like numbers referring to like elements.

The processor module 605, cache module 610, memory module 615, north bridge module 620, south bridge module 625, graphics module 630, display module 635, BIOS module 640, network module 645, USB module 650, audio module 655, PCI module 660, and storage module 665, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

In one embodiment, the workstation 105 communications with the enterprise information technology system 100 through the network module 645. In a prophetic example, the network module 645 is an Ethernet interface.

The memory module 615 stores software instructions and data. The processor module 605 executes the software instructions and manipulates the data as is well known to those skilled in the art. In one embodiment, the memory module 615 stores and the processor module 605 executes one or more software processes that embody the primary visualization module 505, minimap module 510, navigation module 515, status module 520, and search indicator module 525.

The schematic flow chart diagrams that follow are generally set forth as a logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
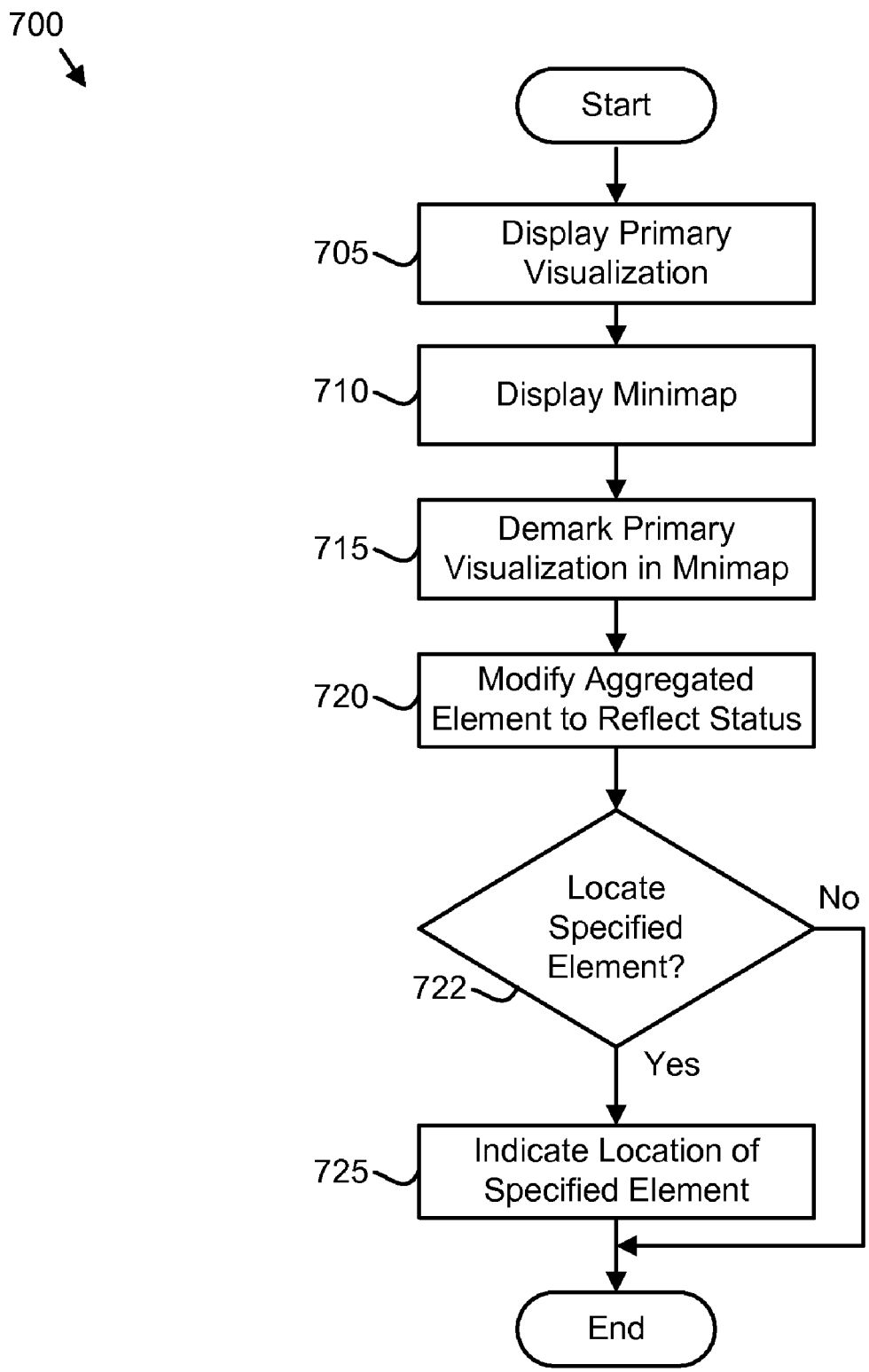
FIG. 7 is a schematic flow chart diagram illustrating one embodiment of a complimentary, high-level graphical representation display method of the present invention.

FIG. 7 is a schematic flow chart diagram illustrating one embodiment of a complimentary, high-level graphical representation display method 700 of the present invention. The method 700 substantially includes the steps to carry out the functions presented above with respect to the operation of the described apparatus 200, 205, 500, 105 and system 100 of FIGS. 1-6. The description of the method 700 also refers to elements of FIGS. 1-6, like numbers referring to like elements.

The method 600 begins and the primary visualization module 505 displays 705 a primary visualization that is a schematic representation of one or more elements of a selected portion of the enterprise information technology system 100. The primary visualization module 505 may display 705 the primary visualization in the primary visualization window 200. In one embodiment, the user selects the one or more elements from a schematic representation of the enterprise information technology system 100 as the primary representation. In a certain embodiment, the user may select an aggregated element 235 that represents one or more devices and the primary visualization module 505 displays 705 the elements embodied by the aggregated element 235.

The minimap module 510 displays 710 a minimap 205 that is an abstracted, high-level schematic representation of the enterprise information technology system 100. In one embodiment, the minimap module 510 displays 710 the minimap 205 when the primary visualization is displayed 705. In an alternate embodiment, the minimap module 510 displays 510 the minimap 205 except when the primary visualization represents substantially all of the enterprise information technology system 100.

A navigation module 515 demarks 715 the primary visualization representation within the minimap 205. In one embodiment, navigation module 515 demarks 715 the primary visualization representation with the demarcation box 230. In an alternate embodiment, the navigation module 515 demarks the primary visualization representation by shading the primary visualization representation. The navigation module 515 may also brighten, flash, modify a color, and change a text style and/or font to demark 715 the primary visualization representation.

In one embodiment, the status module 520 modifies 720 the representation of an aggregated element 235 of the minimap 205 to indicate a status for the aggregated element 235. The status module 520 may also modify 720 the representation of each aggregated element 235 to indicate the status for each aggregated element 235. In a certain embodiment, the status module 520 modifies the color of the aggregated element 235. The status module 520 may also modify 720 text, a status bar, a shading, a boundary, a flashing, and a pattern of the aggregated element 235.

The search indicator module 525 may determine 722 whether to locate a specified element. In a certain embodiment, the search indicator module 525 determines 722 to locate the specified element if a search software process identifies the specified element. In a prophetic example, the search software process may communicate an element identifier to the search indicator module 525 to identify the specified element. In an alternate embodiment, the search indicator module 525 determines 722 to locate the specified element in response to receiving an element identifier for the specified element from the user. If the search indicator module 525 determines 722 not to locate the specified element, the method 700 may end.

In one embodiment, if the search indicator module 525 determines 722 to locate the specified element, the search indicator module 525 indicates 725 the relative location of a selected element on the minimap 205 and the method 700 ends. In a prophetic example, the search indicator module 525 may indicate 725 the location of a specified element within an aggregated element 235. The element may be specified in response to a search. The search indicator module 525 may indicate 725 the relative location of the specified element using text, a status bar, a color, a shading, a boundary, a flashing, a pattern, or the like. The method 700 displays a high-level graphic representation that provides context for and supports navigation of the primary visualization of the enterprise information technology system 100.

Figure 8:
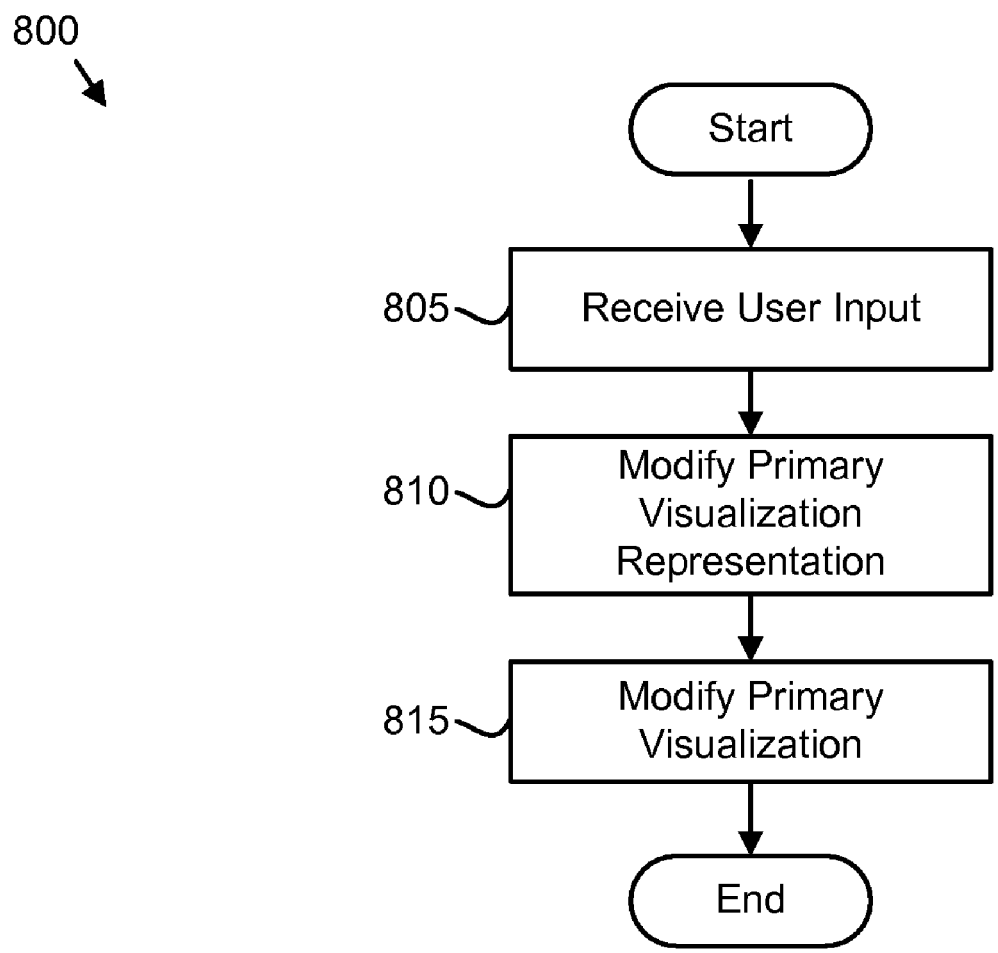
FIG. 8 is a schematic flow chart diagram illustrating one embodiment of a navigation method of the present invention.

FIG. 8 is a schematic flow chart diagram illustrating one embodiment of a navigation method 800 of the present invention. The method 800 substantially includes the steps to carry out the functions presented above with respect to the operation of the described apparatus 200, 205, 500, 105, system 100, and method 700 of FIGS. 1-7. The description of the method 800 also refers to elements of FIGS. 1-7, like numbers referring to like elements.

In one embodiment, the navigation module 515 receives 805 a user input directed to the demarked primary visualization representation within the minimap 205. In a prophetic example, the navigation module 805 may receive a user input selecting an aggregated element 235 of the minimap 205 such as the first aggregated element 235a. Alternatively, the user input may indicate a direction relative to the aggregated element 235.

The navigation module 515 may modify 810 the primary visualization representation in response to the user input. In the prophetic example above, the navigation module 515 may modify 810 the primary visualization representation to demark the first aggregated element 235a and will be illustrated in FIG. 9. In one embodiment, the navigation module 515 modifies 810 the primary visualization representation by panning the primary visualization representation across the minimap 205. In an alternate embodiment, the navigation module 515 modifies 810 the primary visualization representation by centering the primary visualization representation around a location indicated by the user input.

Figure 9:
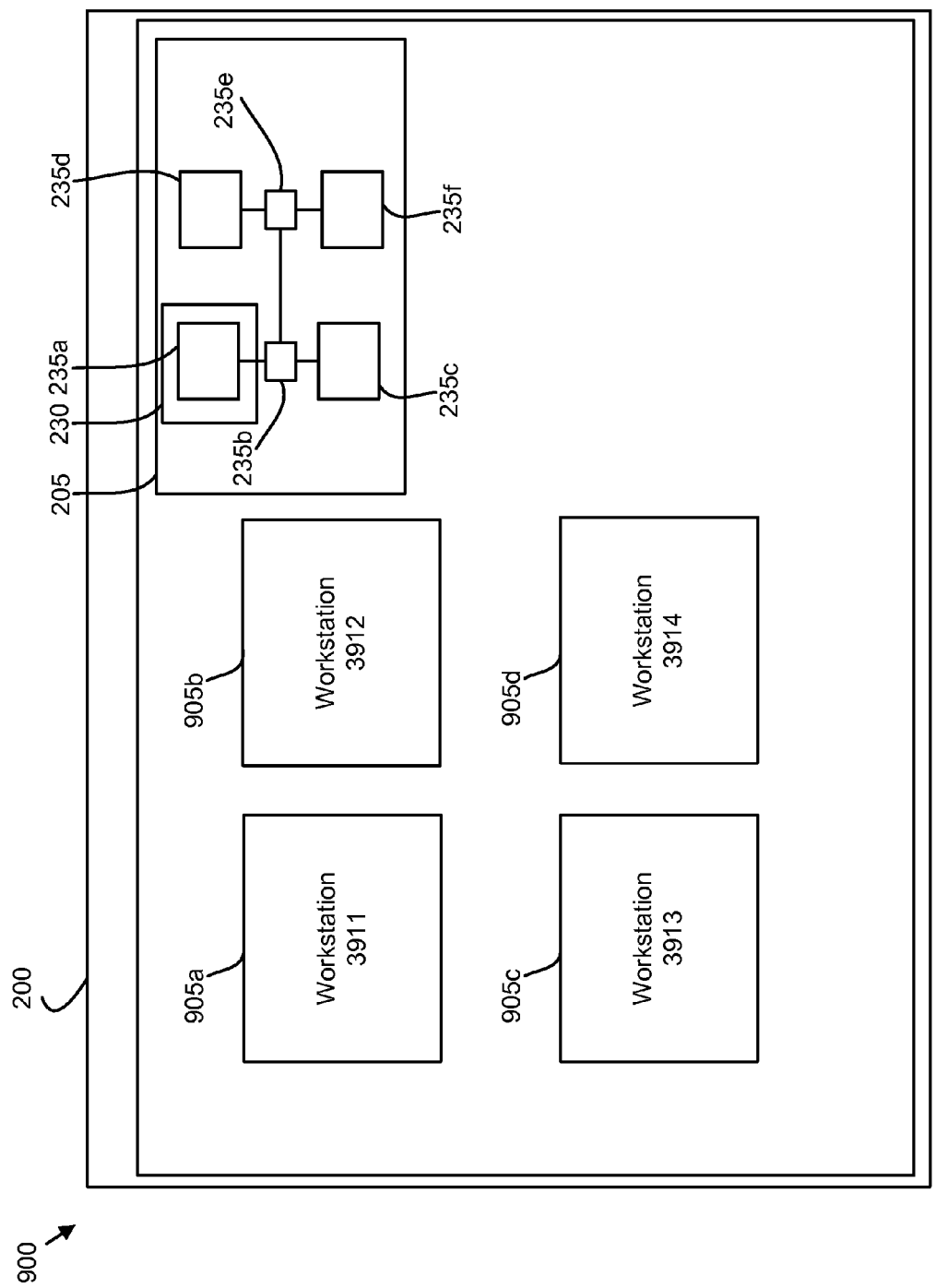
FIG. 9 is a schematic block diagram illustrating one embodiment of a modified primary visualization of the present invention.

In one embodiment, the navigation module 515 modifies 815 the primary visualization of the primary visualization window 205 to correspond to the primary visualization representation such as will be shown hereafter in FIG. 9. The method 800 navigates the primary visualization by navigating the primary visualization representation within the minimap 205.

FIG. 9 is a schematic block diagram illustrating one embodiment of a modified primary visualization 900 of the present invention. The primary visualization window 200 of FIG. 2 is shown. In addition, following the prophetic example of step 810 of FIG. 8, demarcation box 230 is modified 810 to demark the first aggregated element 235a. The primary visualization of the primary visualization window 205 is also modified 815 as described in step 815 of FIG. 8 to correspond to the primary visualization representation. Thus the primary visualization window 200 includes schematic boxes 905 representing each workstation 105 of the workstation group 110. In addition, each schematic box 905 identifies the type of device and provides an identifier for the device.

The embodiment of the present invention displays a complimentary, high-level graphical representation of the enterprise information technology system 100 that provides context for a primary visualization of the enterprise information technology system 100. In addition, the embodiment of the present invention supports navigating the primary visualization within the context of the enterprise information technology system 100.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to display a complimentary, high-level graphical representation, the apparatus comprising:
   a primary visualization module configured to display a primary visualization that is a schematic representation of an element of a selected portion of an enterprise information technology system, the enterprise information technology system comprising a plurality of elements;
   a minimap module configured to display a minimap that is an abstracted, high-level schematic representation of the enterprise information technology system, wherein the abstracted, high-level schematic representation combines functionally similar elements into aggregated elements; and
   a navigation module configured to demark a primary visualization representation within the minimap, the primary visualization representation corresponding to the primary visualization, and modify the primary visualization representation and the corresponding primary visualization in response to a user input directed to the demarked primary visualization representation within the minimap.

2. The apparatus of claim 1, wherein the navigation module is further configured to pan the demarked primary visualization representation in response to the user input.

3. The apparatus of claim 1, wherein the navigation module is further configured to center the demarked primary visualization representation in relation to an element in response to the user input selecting the element.

4. The apparatus of claim 1, further comprising a status module configured to indicate a status of each aggregated element represented by the minimap.

5. The apparatus of claim 1, wherein the status is indicated by an indicator selected from text, a status bar, a color, a shading, a boundary, a flashing, and a pattern.

6. The apparatus of claim 1, further comprising a search indicator module configured to indicate the relative location of a specified element on the minimap wherein the specified element is identified by a search of the enterprise information technology system.

7. A computer program product comprising a computer useable medium having a computer readable program, wherein the computer readable program when executed on a computer causes the computer to:
   display a primary visualization configured as a schematic representation of an element of a selected portion of an enterprise information technology system, the enterprise information technology system comprising a plurality of elements;

display a minimap configured as an abstracted, high-level schematic representation of the enterprise information technology system, wherein the abstracted, high-level schematic representation combines functionally similar elements into aggregated elements;

demark a primary visualization representation within the minimap, the primary visualization representation corresponding to the primary visualization; and modify the primary visualization representation and the corresponding primary visualization in response to a user input directed to the demarked primary visualization representation within the minimap.

8. The computer program product of claim 7, wherein the computer readable program is further configured to pan the demarked primary visualization representation in response to the user input.

9. The computer program product of claim 8, wherein the computer readable program is further configured to center the demarked primary visualization representation in relation to an element in response to the user input selecting the element.

10. The computer program product of claim 7, the computer readable program further configured to indicate a status of each aggregated element represented by the minimap.

11. The computer program product of claim 10, wherein the status is configured as an aggregated status of each element of the aggregated group.

12. The computer program product of claim 10, wherein the status is indicated by an indicator selected from text, a status bar, a color, a shading, a boundary, a flashing, and a pattern.

13. The computer program product of claim 7, the computer readable program further configured to search the enterprise information technology system for a specified element and to indicate the relative location of the specified element on the minimap.

14. A system to display a complimentary, high-level graphical representation, the system comprising:

an enterprise information technology system;

a workstation in communication with the enterprise information technology system and comprising:

a primary visualization module configured to display a primary visualization that is a schematic representation of an element of a selected portion of the enterprise information technology system, the enterprise information technology system comprising a plurality of elements;

a minimap module configured to display a minimap that is an abstracted, high-level schematic representation of the enterprise information technology system, wherein the abstracted, high-level schematic representation combines functionally similar elements into aggregated elements; and a navigation module configured to demark a primary visualization representation within the minimap, the primary visualization representation corresponding to the primary visualization, and modify the primary visualization representation and the corresponding primary visualization in response to a user input directed to the demarked primary visualization representation within the minimap.

15. The system of claim 14, the workstation further comprising a status module configured to indicate a status of each aggregated element represented by the minimap.

16. The system of claim 15, wherein the status is indicated by an indicator selected from text, a status bar, a color, a shading, a boundary, a flashing, and a pattern.

17. The system of claim 14, the workstation further comprising a search indicator module configured to indicate the relative location of a specified element on the minimap wherein the specified element is identified by a search.

18. A method for deploying computer infrastructure, comprising integrating computer-readable code into a computing system, wherein the code in combination with the computing system is capable of performing the following:

display a primary visualization configured as a schematic representation of an element of a selected portion of an enterprise information technology system, the enterprise information technology system comprising a plurality of elements;

display a minimap configured as an abstracted, high-level schematic representation of the enterprise information technology system, wherein the abstracted, high-level schematic representation combines functionally similar elements into aggregated elements; and demark a primary visualization representation within the minimap, the primary visualization representation corresponding to the primary visualization;

indicate a status of each aggregated element represented by the minimap using an indicator selected from text, a status bar, a color, a shading, a boundary, a flashing, and a pattern;

indicate the relative location of a specified element on the minimap; and modify the primary visualization representation and the corresponding primary visualization in response to a user input directed to the demarked primary visualization representation within the minimap.

* * * * *